Sept. 16, 1952   W. J. SCHIESER ET AL   2,610,725
SPACING MECHANISM

Filed Nov. 16, 1949   2 SHEETS—SHEET 1

Inventors
Warren J. Schieser
John F. Kelley

By W. J. McDowell
Attorney

Inventors
Warren J. Schieser
John F. Kelley
By W. S. McDowell
Attorney

Patented Sept. 16, 1952

2,610,725

UNITED STATES PATENT OFFICE 2,610,725

SPACING MECHANISM

Warren J. Schieser and John F. Kelley, Columbus, Ohio, assignors to The Exact Weight Scale Company, Columbus, Ohio, a corporation of Ohio Application November 16, 1949, Serial No. 127,708

9 Claims. (Cl. 198—34)

This invention relates to conveyor apparatus for delivering articles in single, successive and rapidly executed order to a critical zone, as in automatic weight-checking operations employed on packaged goods.

In automatic check-weighing apparatus, packaged goods are advanced by conveyor action along a prescribed linear course of travel and while in motion advance over the weight-receiving platter of a rapidly operating weighing scale. Heretofore, reliance has been placed on the relative spacing between the individual articles or packages undergoing weighing to provide for the single delivery and passage thereof on and over the weighing platter of the scale mechanism, with the result that at certain times in the operation of the apparatus more than one of the articles or packages will occupy the platter at the same time, thus introducing error into the automatic responses and operations of the check-weighing equipment.

It is therefore an object of the present invention to provide a check-weighing mechanism in which the articles or packages undergoing such weighing are advanced by positively driven conveyor means to a weighing scale-platform conveyor and wherein provision is made in the drive of the conveyor for producing in a positive manner the deposit of but a single box, package or article on the scale conveyor during each of automatically performed, successive weighing operations.

In carrying out the invention, we employ a longitudinally movable motor-driven feeder which embodies a conveyor belt upon which the articles or products to be check-weighed are positioned for advancement along a longitudinally extending way leading to an adjoining conveyor forming a movable part of an associated weighing apparatus, the said longitudinally extending way being provided with a stationary shoulder or abutment arranged to engage the articles or products moving along the way in response to the operation of the feeder conveyor belt and to momentarily stop or arrest such movement until such articles or products are released from engagement with the shoulder or abutment, such release being effected by the timed operation of an oscillatory finger which is synchronously actuated in unison with the drive employed for imparting movement to the feeder conveyor belt, the finger being moved between extended and retracted positions, whereby when the same occupies its retracted position, articles or products may move with the feeder belt into engagement with the shoulder or abutment and when in its extended or projected position, the said finger engages said articles or products to release the same from contact with said shoulder or abutment and thereby cause the articles or products so released to be advanced in successive order for delivery to the weighing scale conveyor, the timed operation of the oscillatory finger assuring the deposit of but a single article or product on the conveyor during operation of the machine.

This invention constitutes a continuation in part of that disclosed in our prior copending application, Serial No. 40,544 filed July 24, 1948.

For a further understanding of the invention, including additional objects, advantages and constructional features thereof, reference is to be had to the following description and the accompanying drawings, wherein.

Figure 1:
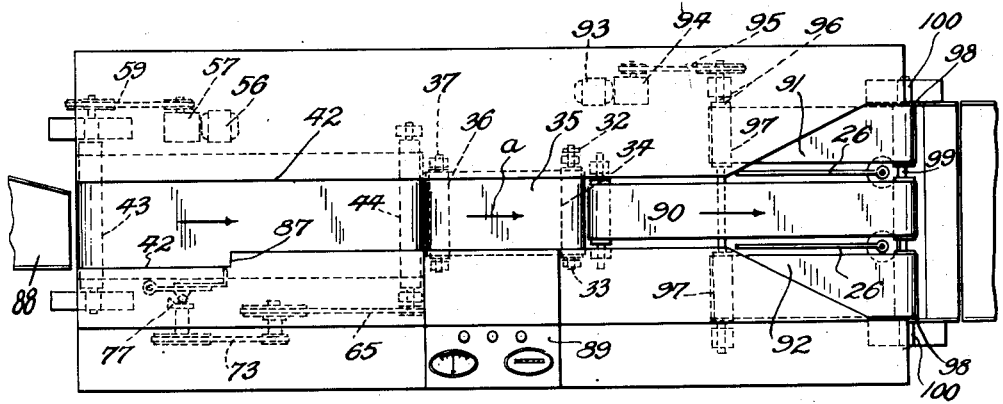
Fig. 1 is a top plan view of a check-weighing and classifying machine having the conveyor system forming the present invention.
Figure 2:
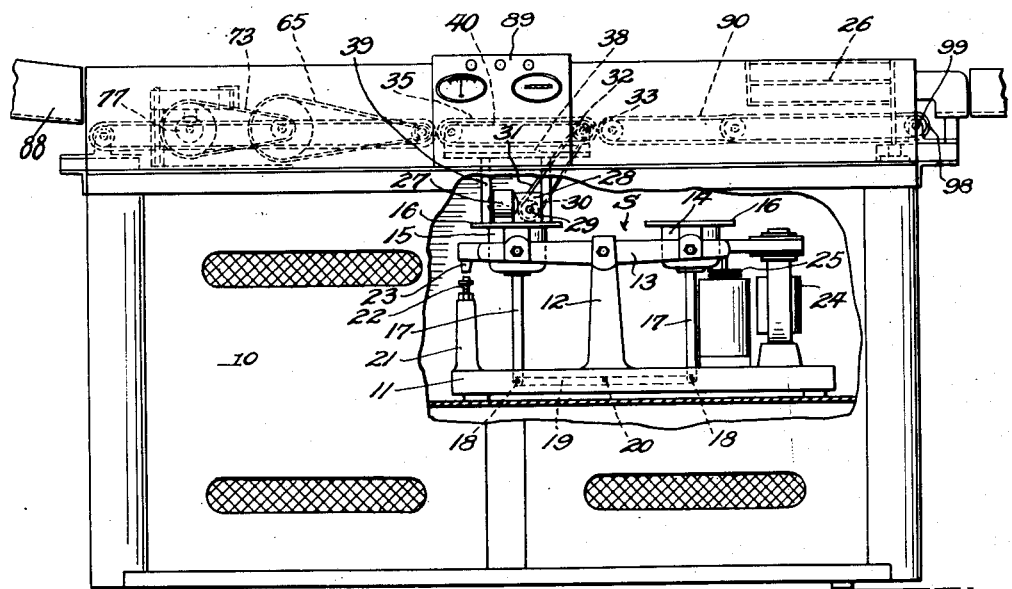
Fig. 2 is a front elevational view of the machine, with parts of the machine casing broken away to disclose interior structure.

Referring to the drawings, the numeral 10 designates a casing or cabinet in or on which the conveyor apparatus comprising the present invention is supported. The apparatus includes a weighting scale S which, in this instance, has been shown as of the even balance type, although other types of weighing devices may be used. As illustrated, the scale provides a base 11 carrying a bracket 12 which, at its upper end, pivotally supports the intermediate portion of a weighing beam or lever 13. Spaced equidistantly from its pivotal axis of turning movement on the bracket or standard 12, the lever carries pivotally mounted known weight and commodity receivers 14 and 15, respectively. These receivers include outrider platters 16 from which depend rigid stems 17, the lower ends of the latter being pivoted, as at 18, to a check rod 19 which, in turn, is centrally pivoted as at 20 on the base 11 or the bottom of the bracket or standard 12. The base may also be provided with one or more upright posts 21 carrying at the upper end thereof an adjustable stop 22 which is engageable with a depending lug 23 for limiting the extent of oscillation of the lever or beam. At its opposite end, the lever is provided with a dashpot 24 and with the movable plate 25 of a variable condenser of the type set forth in the patent of Flannigan et al., No. 2,323,023 and which is employed to operate circuits, not shown, controlling the movement of pivoted diverter gates 26 used in diverting packages or products which are above or below a predetermined weight norm, causing such under or overweight packages or products to be released from the apparatus in paths of travel different from that of packages or products of an acceptable or desired weight.

Mounted on the upper surface of the outrider platter of the commodity receiver 15 is an electric motor 27, said motor having associated with the armature shaft thereof a speed-reducing gearing enclosed in a housing 28 and which gearing includes a driven shaft 29. This shaft is equipped with a sprocket 30 around which passes an endless chain 31, the latter leading to a corresponding sprocket 32 provided on a cross shaft 33. This shaft also carries an elongated belt wheel or drive roller 34 around which is trained the rear or discharge end of an endless conveyor belt 35. The upper run of this belt travels in the direction of the arrow $a$ indicated in Fig. 1, and the forward end of the belt is passed around an elongated belt wheel or roller 36, carried by a cross shaft 37 journaled in a scale supported conveyor platform 38 in the same manner as the cross shaft 33. The conveyor platform is formed in this instance with downwardly projecting studs 39 which are joined with the platter of the receiver 15. The upper run of the conveyor belt 35 may pass along a shelf or plate 40 attached to and forming a part of the platform.

The present invention is concerned primarily with a means for positively feeding boxes, packages and various commodities in a rapid but single successive manner to the conveyor belt 35 of the scale mechanism so that in the automatic operation of the apparatus, but one article or product will be delivered to the scale for each weighing or check-weighing operation.

The top of the cabinet is provided with a horizontal supporting plate 41 carrying spaced guide members 42 which define between them a longitudinally extending way for the travel of articles or packages in a substantially linear course toward the scale conveyor 35. Journaled in the guide members 42 are rolls 43 and 44 around which pass the endless belt 55 of a feeder conveyor F, the latter being disposed in longitudinally aligned relationship with the scale conveyor and in generally the same horizontal planes.

The feeder conveyor belt is driven by an electric motor 56, which is joined with a speed-reducing mechanism in a casing indicated at 57, said mechanism including a driven shaft carrying a belt wheel 58 over which passes a drive belt 59, the latter being also trained over a similar wheel 60 carried by the shaft 61 of the roller 43, which is employed in driving the belt 55 of the feeder conveyor.

The roller 44 is provided with reduced shaft extensions 62 on the ends thereof which are rotatably journaled in bearings 63. One of these shaft extensions is provided with a pulley 64 around which passes an endless belt 65, the latter being also trained over a grooved belt wheel 66. This wheel is supported on one end of a shaft 67 which is rotatably journaled in a bearing 68 forming a part of a bracket 69, the latter being mounted for longitudinal adjustment on a base plate 70, carried by the top of the cabinet 10.

The adjustment of the base plate may be maintained by means of fastening elements 71. The end of the shaft 67 opposite to that carrying the belt wheel 66 is provided with a pulley 72 around which passes an endless belt 73, the latter being also received by a grooved belt wheel 74 fixed on a shaft 75 which is journaled in a bearing 76 adjustably carried by the base plate 70. The end of the shaft 75 opposite to that containing the belt wheel 74 has fixed thereon for rotation a cam member 77, the nose 78 of said member being engaged with a roller 79 carried by the intermediate portion of an oscillatory plunger or finger 80. The latter is pivotally mounted on a post 81 stationarily arising from the plate 70, and a coil spring 82 has one of its ends connected with an outer portion of the plunger or finger and its opposite end connected with a stud 83 carried by and extending upwardly from the plate 70.

The plunger or finger includes at its outer end a laterally turned extension 84 which operates through a slot 85 provided in one of the guide members 42, so that the outer end of the extension 84 will be engageable with a box, package or article, shown at 86, in engagement with a laterally positioned stationary shoulder or abutment 87 forming a part of the guide member.

Figure 3:
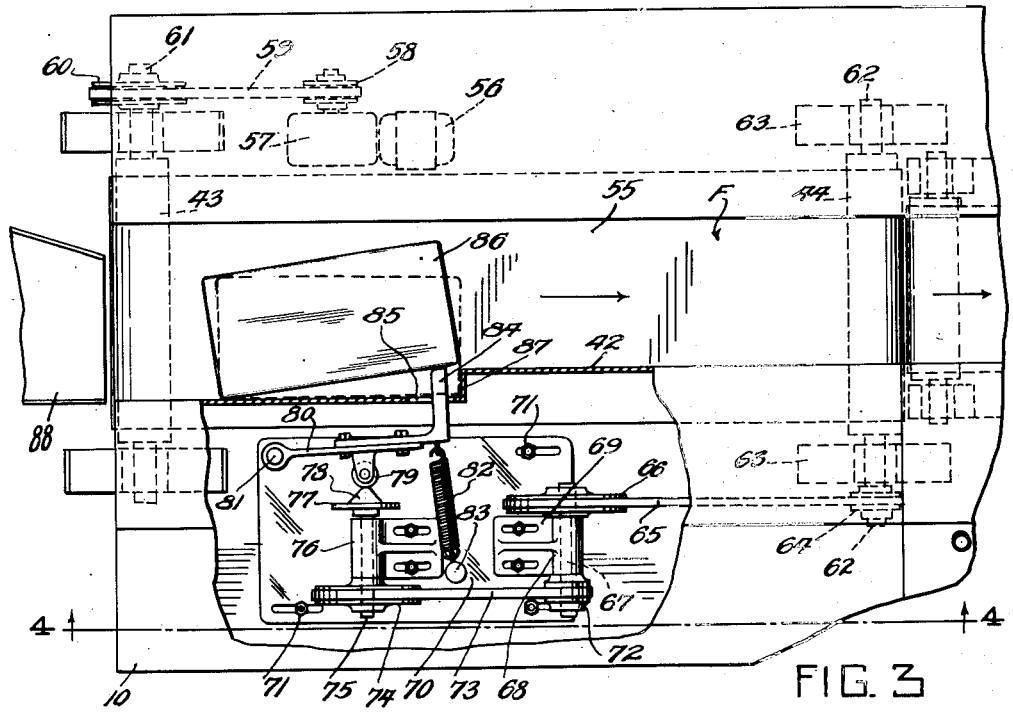
Fig. 3 is a fragmentary top plan view of the feeder conveyor of our improved system and disclosing its associated oscillatory finger or plunger for moving an article from a position of engagement with a stationary shoulder to a position providing for movement of the article in unison with the conveyor.
Figure 4:
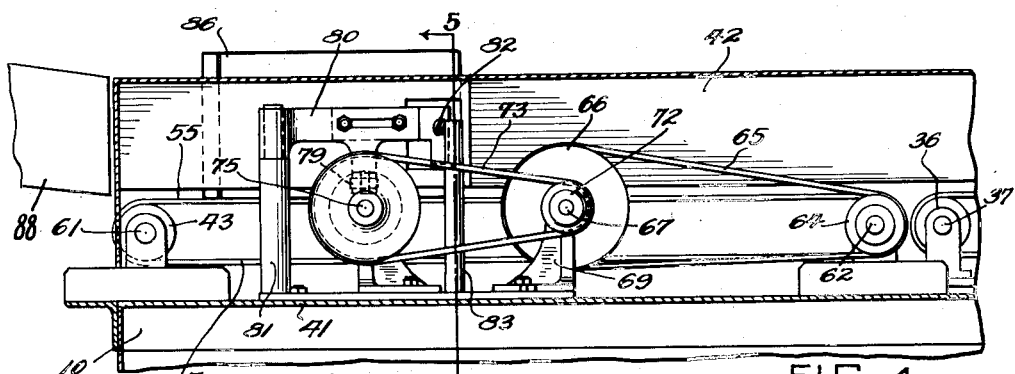
Fig. 4 is a front elevational view of the apparatus disclosed in Fig. 3.
Figure 5:
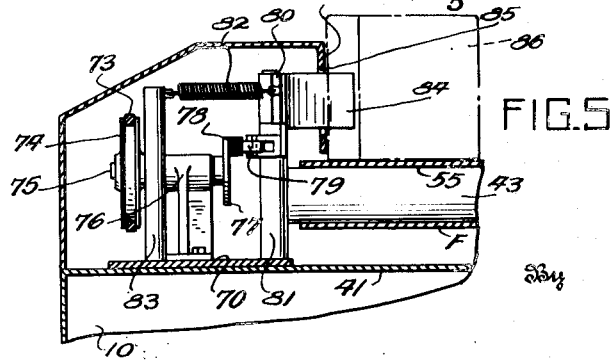
Fig. 5 is a vertical transverse sectional view taken through the apparatus on the plane indicated by the line 5—5 of Fig. 4.

In the operation of the apparatus, the boxes or commodities 86 are delivered to the belt 55 of the feeder conveyor by means of a chute 88 down which the boxes or commodities slowly gravitate, although other equivalent delivery means may be used. When the boxes or commodities are engaged by the belt 55, the same are conducted thereby longitudinally of the guideway until the conducted article strikes the shoulder or abutment 87, as shown by broken lines in Fig. 3. Forward movement of the article is arrested by the engagement thereof with the shoulder or abutment, and the article remains at rest until the extension 84 of the finger or plunger 80 moves inwardly against the action of its coil spring 82 by means of the positive outward thrust imparted thereto by the nose 78 of the cam member 77, as shown in full lines in Fig. 3. When thus freed from engagement with the shoulder or abutment, the article then again advances under the action of the belt 55 and is delivered to the belt of the scale conveyor when a check-weighing operation takes place.

The movement of the finger or plunger 80 is so timed and coordinated with the linear speed of the belt 55 of the feeder conveyor and the belt 35 of the scale conveyor that but a single box or package will be in engagement with the scale conveyor belt for each weighing operation. These individual operations, however are very rapidly executed and the apparatus possesses a capacity rate of 90 or more separate check-weighing operations per minute. The apparatus is designed for operation in a production line and checks the weight of every article passing over its weighing member, automatically separating them into weight classification groups. The apparatus incorporates both accuracy and high speed operation, eliminating the human element in precision weighing.

After the weight determinations have been effected by the scale mechanism, and suitable recordings or indications thereof made on instruments mounted on the viewing panel 89, the packages or articles are delivered to a motor-driven discharge conveyor belt 90. Paralleling the discharge portion of the conveyor belt 90 are short laterally disposed conveyors 91 and 92 between which the diverter gates 26 are located. The conveyors 91 and 92 are powered and driven by means of an electric motor 93 which includes speed-reducing gearing in a casing shown at 94 and a belt drive 95 which leads to a head shaft 96 on which rollers 97 are mounted for the passage thereabout of the end portions of the head ends of conveyors 91 and 92.

The opposite ends of said conveyors pass around rollers 98 carried by a foot shaft 99 journaled in bearings 100, the shaft 99 carrying a roller around which passes the foot or discharge end of the conveyor belt 90, so that the latter is also driven by the motor 93. In this regard, it will be observed that the weighing conveyor 35, the feeder or intake conveyor 55 and the discharge conveyor 90 as well as the supplemental conveyors 91 and 92 are all power driven, whereby to provide for a fixed rate of linear advance of packages or articles through the machine, such advance being synchronized with the rapidly actuating weighing scale S. The beam of the latter is deflected but slightly by the advance of packages or boxes over its conveyor 35, the scale being preferably provided with a magnetic damping means or dashpot 24 to quickly stabilize its oscillations in response to applied commodity weights. As previously stated, if the weights of the commodities are within a prescribed normal range, the commodities are discharged from the foot end of the discharge conveyor 90 into a suitable receiver. If the commodities are under or over the prescribed normal range of weight, the diverter gates are automatically positioned so that they swing over the discharge portion of the conveyor 90 and direct the under or over-weight packages into separate receivers therefor.

The apparatus is susceptible to various changes and modifications without departing from the spirit and scope of the following claims.

We claim:

1. Apparatus for delivering commodities successively and in spaced order to a check-weighing mechanism, comprising a base structure defining a longitudinally extending courseway, a conveyor belt disposed in and movable longitudinally of said courseway, motor-driven means for driving said belt, a stop arranged in said courseway and projecting into the normal path of movement of commodities deposited on said belt for arresting advance of such commodities along said courseway in unison with the belt, and intermittently movable plunger means carried by said base structure contiguous to said stop, said plunger means being engageable with a commodity in contact with said stop to move such commodity to a position in which the same is free of the stop, whereby to effect continued advancement of the stop-removed commodity in unison with the belt.

2. Apparatus for feeding articles in single successive order to an associated weighing mechanism, comprising a base structure defining a longitudinally extending courseway, a conveyor belt disposed in and movable longitudinally of said courseway for advancing articles deposited thereon from one end to the other of said courseway, power driven means for driving said belt, a stationary stop projecting into said courseway in the normal path of movement of articles deposited on said belt for arresting advance of such articles along said courseway in unison with said belt, and plunger means carried by said base structure for engagement with an article in contact with said stop, said plunger means being movable transversely of said courseway to shift a stop-engaged article transversely of said belt and free of said stop to cause such article to resume advancing movement in unison with said belt.

3. Apparatus for feeding articles in single successive order to an associated weighing mechanism, comprising a base structure defining a longitudinally extending courseway for the passage of articles, a conveyor belt disposed in and movable longitudinally of said courseway, power driven means for driving said belt to cause articles deposited thereon to be advanced longitudinally of said courseway, a stop arranged in said courseway in the normal path of movement of articles deposited on said belt for arresting advance of articles moving in unison with said belt, a plunger means carried by said base structure for engagement with an article in contact with said stop, said plunger means being movable transversely of said courseway and into engagement with an article in contact with said stop to move such article to a position in which the same is free of the stop and to cause the same to resume its advance in unison with said belt, and means actuated by said power driven means for effecting actuating movement on the part of said plunger means in unison with the longitudinal advance of the conveyor belt.

4. Apparatus as defined in claim 1 and wherein said plunger means is operated by a rotatable cam actuated by power derived from said motor-driven means.

5. Apparatus for feeding articles one at a time to a weighing mechanism, comprising a base, a motor-driven conveyor belt positioned on said base, a stationary guide extending along and adjacent to one side of said belt, said guide being formed with a laterally directed shoulder projecting over one side of said belt in the normal path of movement of articles deposited upon and traveling in unison with said belt, whereby to arrest movement of such articles, power-driven means for driving said belt, a movable displacement member mounted on said base adjacent to said shoulder, and means operated by said power-driven means for intermittently moving said displacement member to positions in engagement with articles contacting said stop, whereby to move the articles to a position free of the stop for continued longitudinal advance on said belt.

6. Apparatus for feeding articles in single successive order to a weighing mechanism, comprising a base, a conveyor on said base for advancing articles along a longitudinally extending guideway carried by said base, a stop shoulder arranged at one side of said guideway and projecting a distance inwardly over said conveyor to arrest advancement of articles moving with said conveyor, an oscillatory article-displacing member mounted on said base contiguous to said shoulder, and means for oscillating said member to cause the same to engage with an article contacting said shoulder and move said article transversely of said conveyor to a position free of said shoulder for its continued longitudinal advance in unison with said conveyor.

7. Apparatus for feeding articles in single successive order to a weighing mechanism, comprising a base, a conveyor on said base for advancing articles along a longitudinally extending guideway carried by said base, a stop shoulder arranged at one side of said guideway and projecting inwardly over said conveyor to arrest advancement of articles moving with said conveyor, an oscillatory article-displacing member mounted on said base contiguous to said shoulder, means for oscillating said member to cause the same to engage with an article contacting said shoulder and move said article transversely of said conveyor to a position free of said shoulder for its continued longitudinal advance in unison with said conveyor, said last-named means including a rotatable actuating cam, a roller on said article-displacing member, and spring means for maintaining the roller of said member in engagement with said cam.

8. In apparatus of the character described, a conveyor for feeding articles in single successive order to a discharge zone, stop means for arresting movement of an article in unison with said conveyor, and a movable control governed by the operation of said conveyor for removing an arrested article from engagement with said stop to resume the advance of the article in unison with said conveyor, said control being actuated in unison with the movement of said conveyor.

9. Commodity segregating and conveying apparatus comprising a conveyor belt having a commodity-receiving end and a commodity-discharging end; motor-driven means for driving said belt to convey commodities deposited thereon from its receiving end to its discharge end; means defining a longitudinally extending courseway over said belt; a stationary abutment provided on said last-named means and projecting transversely inwardly of said courseway intermediate the ends of said conveyor for engaging and arresting the progress of commodities deposited upon said conveyor; a commodity-engaging plunger positioned contiguous to said abutment and movable transversely inwardly of said courseway for shifting a commodity arrested by said abutment laterally of said belt and free of said abutment to effect continued progress of such commodity in unison with said belt; and means driven synchronously with said belt for imparting intermittent movement to said plunger inwardly of said courseway.

WARREN J. SCHIESER.
JOHN F. KELLEY.

REFERENCES CITED

The following references are of record in the file of this patent:

UNITED STATES PATENTS

| Number | Name | Date |
|---|---|---|
| 1,617,301 | Reddick | Feb. 8, 1927 |
| 1,828,232 | Rowe | Oct. 20, 1931 |
| 2,026,856 | Youngdahl | Jan. 7, 1936 |
| 2,467,679 | Lyon | Apr. 19, 1949 |